United States Patent [19]
Nehl et al.

[11] Patent Number: 5,407,114
[45] Date of Patent: Apr. 18, 1995

[54] CONTAINER FOR SOUND CARRIERS

[75] Inventors: Wolfgang Nehl, Waldachtal; Dietmar Renner, Altensteig; Jürgen Skott, Altensteig/Walddorf, all of Germany

[73] Assignee: fischerwerke, Artur Fischer GmbH & Co KG, Waldachtal, Germany

[21] Appl. No.: 147,984

[22] Filed: Nov. 5, 1993

[30] Foreign Application Priority Data

Nov. 5, 1992 [DE] Germany .................. 42 37 368.9

[51] Int. Cl.⁶ ............................................. B60R 5/00
[52] U.S. Cl. ................................. 224/273; 224/281; 224/282; 224/42.45 R; 296/37.1
[58] Field of Search ........ 224/273, 281, 282, 42.45 R, 224/42.46 R; 296/37.1, 37.8, 37.12

[56] References Cited

U.S. PATENT DOCUMENTS

| | | |
|---|---|---|
| 3,627,398 | 12/1971 | Reese ................... 224/281 |
| 4,231,625 | 11/1980 | Perez et al. ............... 224/42.45 R |
| 4,783,110 | 11/1988 | Beukema et al. ............... 296/37.8 |
| 4,815,598 | 3/1989 | Richter ................... 296/37.12 |

FOREIGN PATENT DOCUMENTS

| | | |
|---|---|---|
| 3136755 | 3/1983 | Germany . |
| 8503456 | 2/1985 | Germany . |
| 3542315 | 6/1987 | Germany . |
| 3741830 | 7/1992 | Germany . |

Primary Examiner—Ernest G. Cusick
Assistant Examiner—Steven O. Douglas
Attorney, Agent, or Firm—Michael J. Striker

[57] ABSTRACT

A container for sound carriers, such as compact cassettes, compact discs, and the like, which has a mounting base mountable in a motor vehicle; a container housing releasibly connected with the mounting base. The mounting base has two side faces provided with retaining rails. The container housing has guides in which the retaining rails of the mounting base engage. The mounting base has further guide surfaces. One of the guiding surfaces is formed as a bridge-like web provided with teeth, and resting against a rack of the container housing.

13 Claims, 3 Drawing Sheets

CONTAINER FOR SOUND CARRIERS

BACKGROUND OF THE INVENTION

The present invention relates to a container for sound carriers, such as compact cassettes, compact discs and the like, for mounting in a motor vehicle.

More particularly, it relates to a container for sound carriers which have a mounting base releasably connected to a container housing and mountable in the vehicle.

Known containers for sound carriers have a cover provided with insertion openings and mounted on the rear side of the container housing. A connection piece is engagable in the opening and articulately connected with a mounting base. Depending upon which insertion opening is chosen, the container can be mounted in different positions in a vehicle by screwing on or sticking on of the mounting base. Since the mounting base is connected to the cover attached to the rear side of the housing, the weight of the container produces a movement acting on the mounting base and resulting in undesirable vibration and noise during driving. Moreover, a complicated construction is necessary to avoid fatigue fracture of the mounting base. Moreover, the known mounting base has a lockable hinge joint within the connection piece and the mounting base, so that the container can be brought into different angular positions for improving access. Since the moment originated from the container acts directly on the hinge joint, the container may inadvertently be displaced from its angular position, especially when the vehicle is subjected to hard jolts.

SUMMARY OF THE INVENTION

Accordingly, it is an object of the present invention to provide a container for sound carriers, which avoid the disadvantages of the prior art.

More particularly, it is an object of the present invention to provide a container for sound carriers which is mountable in a vehicle and can be attached to a mounting base in a removable and vibration-resistant manner, while the mounting base in mounted in the vehicle and is economical to produce.

In keeping with these objects and which others which will be apparent hereinafter, one feature of the present invention, resides briefly stated in a container for sound carriers in which the mounting base has a retaining rail on each of its two side faces, the retaining rails engage in guides of the container housing that engaged over the retaining rails, and further guide surfaces are arranged on the mounting base so that one guide surface is formed by a bridge-like web which is provided teeth and which presses resiliently against a rack arranged on the container housing.

When the container is designed in accordance with the present invention, with the retaining rail arranged on the side faces of the mounting base and engaging in corresponding guides on the container housing, connection provided in this way is capable of absorbing lateral and vertical forces acting on the container. At the same time, the container is supported below its center of gravity when it is in a seated position and above its center of gravity when it is in a suspended position. Thus, no vibration or stress peaks can occur in the mounting base as a result of movement stresses.

The guide surface formed by a bridge-like web provided with teeth secures the container in the direction in which it is slid onto the mounting base. The web engages resiliently in a rack arranged on the container housing, and therefore unintentional displacement is prevented by interlocking of the teeth between the mounting base and the container. The bridge-like web can be disengaged from the rack of the container's housing only by sliding forces applied manually, so the container can be mounted and removed when needed. In accordance with an advantageous feature of the present invention the teeth on the web and on the rack are rounded tooth and/or provided with inclined tooth profiles.

In accordance with a further embodiment of the invention, the container can be provided with two racks extending mirror-symmetrical and parallel, so that the container housing can always be slid on in the correct position even if the mounting base is turned.

For improving the resilient action of the web, it is advantageous in accordance with another feature of the present invention to make the mounting base for example of plastic, including the bridge-like web, and to support it by a metal spring.

In accordance with the still a further embodiment of the invention, for arranging the container in an angular position the mounting base can be formed by an upper part that can be connected to the container housing and a lower part that can be mounted in the vehicle. The two parts can be connected by joint and be lockable in various angular positions relative to one another. The end faces of the upper and lower part can be provided with opening arranged one above the other and in alignment with another, in which openings slider members guided in the upper part can be engaged by projections arranged on the end faces of the sliding member and matched to the opening. This provides a locking of the parts in various angled positions relative to one another. The engagement of the projection in their aligned openings of the two parts produces a positively-locking connection preventing unintentional changes of the angle.

According to a further embodiment of the present invention, for setting a desired angle and securing a desired angular position, the slider members are connected with one another by a movable cross-bar by means of pegs arranged on the slider member and engaging in obliquely located oblong slots in the crossbar. A lug is provided on the cross-bar and engages in the guide surfaces of the container housing. It is provided with portions of the guide surfaces of the mounting face. Therefore, once the container housing has been slid onto the mounting base, the cross-bar and at the same time the slider members engaged in the openings are reliably locked. The angular position of the container housing is therefore secured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
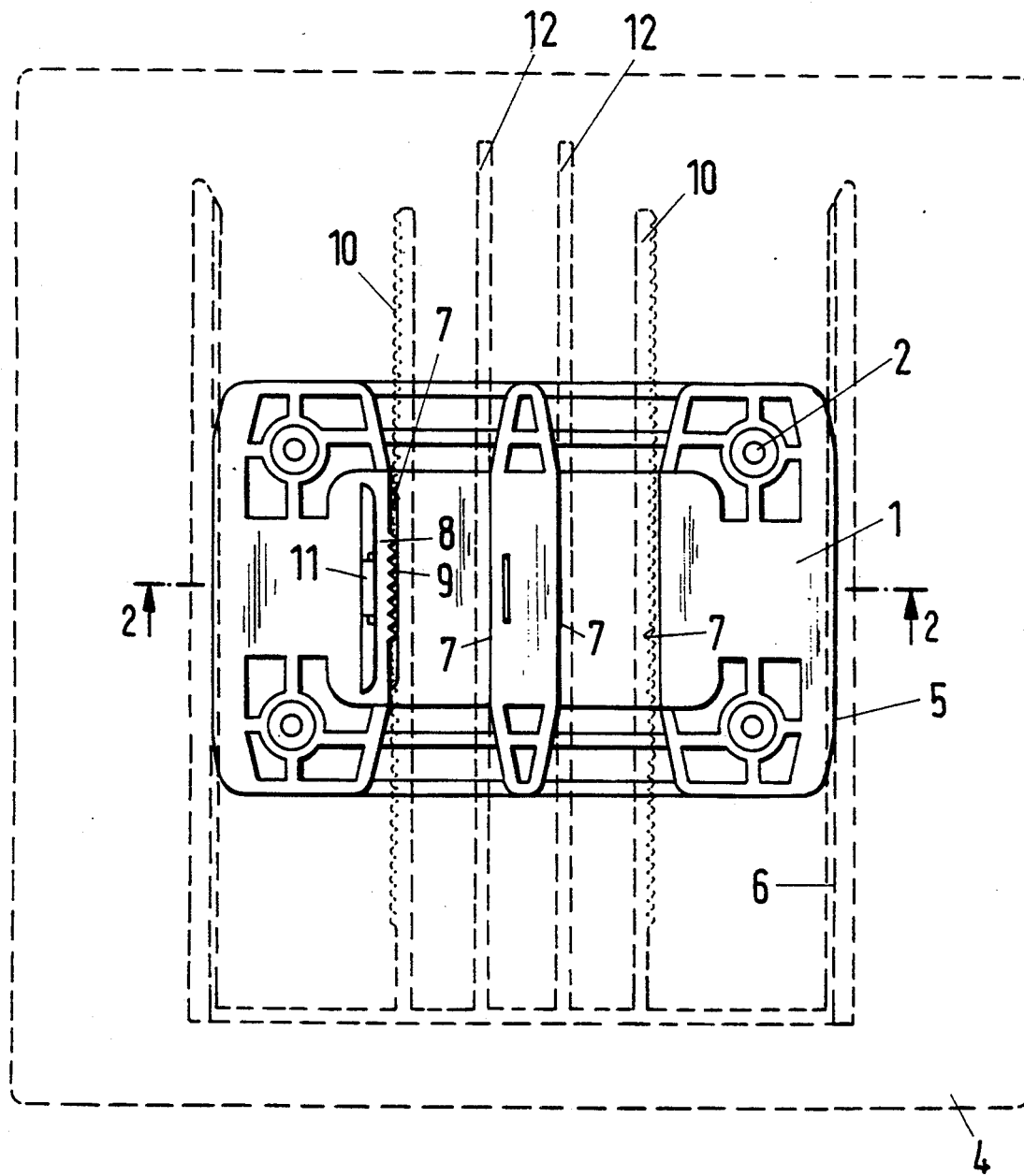
FIG. 1 is a plan view of a mounting base of a container for sound carriers in accordance with the present invention.

A container for the sound carrier in accordance with the present invention has a mounting base 1 which is formed as a plastic plate. For mounting the mounting base 1 in a vehicle it is provided with four attachment holes 2 and/or a not shown double-sided adhesive tape on its underside 3. A container housing 4 is held on the mounting base 1. For this purpose, projecting retaining rails 5 are arranged on two side faces of the mounting base and engaged in corresponding guides 6 of the container housing 4.

For sliding the container onto the mounting base without canting, the mounting base has several guide surfaces 7 extending parallel to the retaining rails. One of the guide surfaces is formed as a bridge-like web with a surface provided with teeth 9. The web engages in a rack 10 arranged on the container housing 4. The teeth have rounded tooth tips and inclined tooth profiles. Therefore, it is possible on application of suitable sliding pressure, to slide the container housing 4 onto the mounting base 1 and to remove it when necessary. When suitable pressure is applied, the bridge-like web 8 yields sufficiently so that the teeth become disengaged. A leaf spring 11 is attached to the sides of the web 8 to improve or assist the resilient action of the web.

The container can be slid onto the mounting base from either side due to the provision of the second rack 10. The second, non-engaged rack acts at the same time as a guide to prevent the container canting when it is being slid on. Guide bars 12 are also arranged on the container housing 4 to serve the same purpose.

Figure 2:
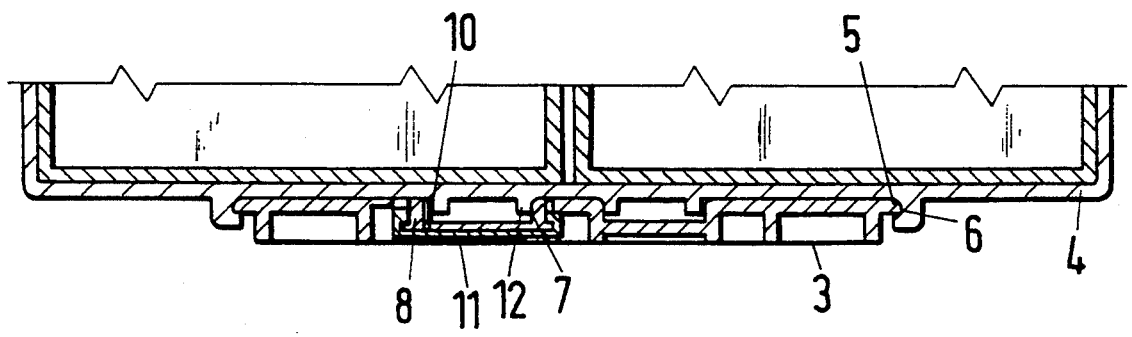
FIG. 2 is a view showing a longitudinal section through the mounting base of FIG. 1, with the container seated thereon.

A mounting base 1 a in accordance with the another embodiment shown in FIGS. 3-6 has an upper part 13 connectable to the container housing 4 and a lower part 14 attachable to the vehicle by screws or an adhesive film. Upper and lower parts are releasibly connected to one another by a joint 15. The upper part 13 and the container housing 14 are releasibly connected with one another similarly to the embodiment of FIGS. 1 and 2.

For locking the upper and lower parts in an angular position relative to one another, the parts are provided on their end faces with openings 16 arranged one above the other and aligned with one another. Projections 17 matched to the opening 16 are provided on two slider members 18 are guided in the upper part 13 to engage in the openings. The openings in the lower part for 14 can be closed by and injection-molded skin 19 shown in FIGS. 5 and 6 in order to improve the appearance. For changing the angular position, the projection 17 are disengaged by withdrawing of the slider member 18. The withdrawal of the slider member is performed by a moveable cross-bar 20 which is connected to the slider members 18 by pegs 21. The pegs engage in obliquely arranged oblong slots 22 in the cross-bar 20. Therefore, by moving the cross-bar 20, the slider members 18 are moved in a direction of movement at a right angle to it.

A peg 23 is arranged on the cross-bar and engages through the hole 24 in the guide bars 12 of the container housing. The movement of the cross-bar 20 is provided by the peg 23. The peg forms a portion of the guide surfaces 7 of the mounting base 1a. When the peg is engaged and therefore the angular position is locked, the peg 23 is located within the two guide bars 12 of the container housing 4 and therefore the slider members 18 cannot be disengaged inadvertently. When the container housing 4 pushed onto the mounting 1 a is held by the retaining rails 5 of the upper part, the retaining rails 5 engage in the corresponding guides 6 of the container housing 4. Therefore, the bridge-like web 8 with the teeth 9 engages in the rack 10 and the container housing 4 is locked in the direction of sliding.

Figure 3:
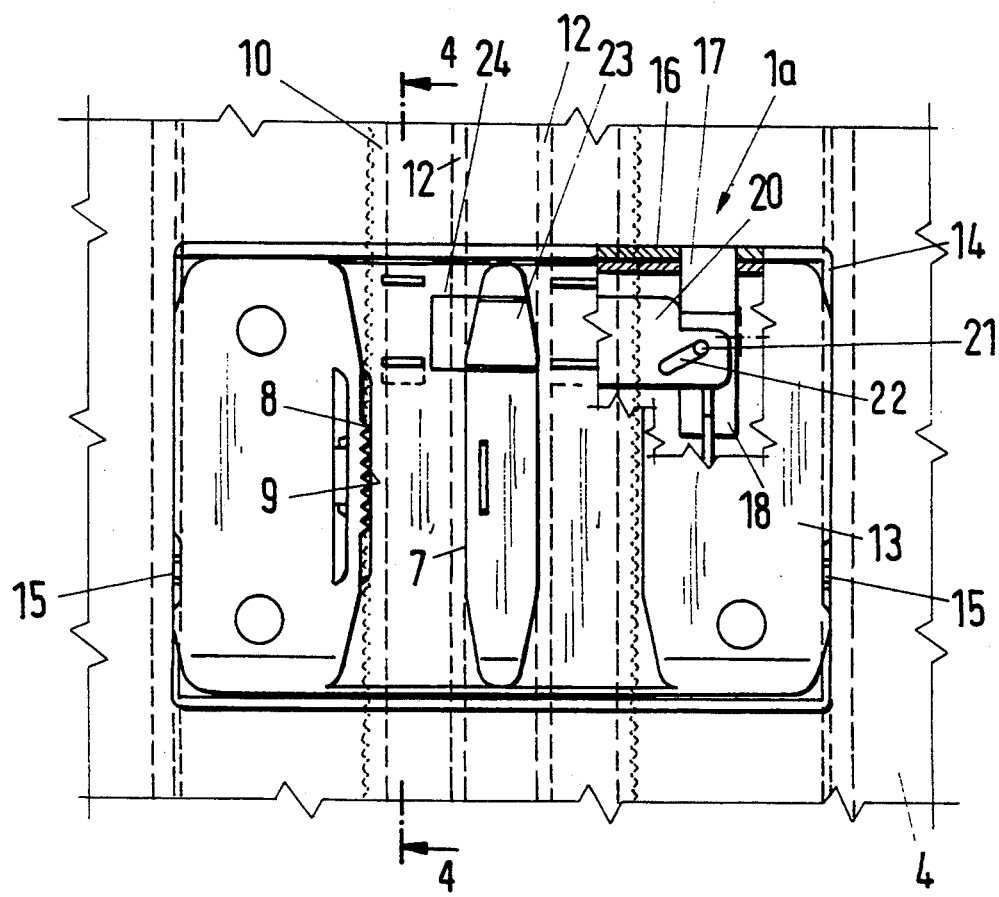
FIG. 3 is a view showing a further embodiment of the mounting base with means for adjustment of the container.
Figure 4:
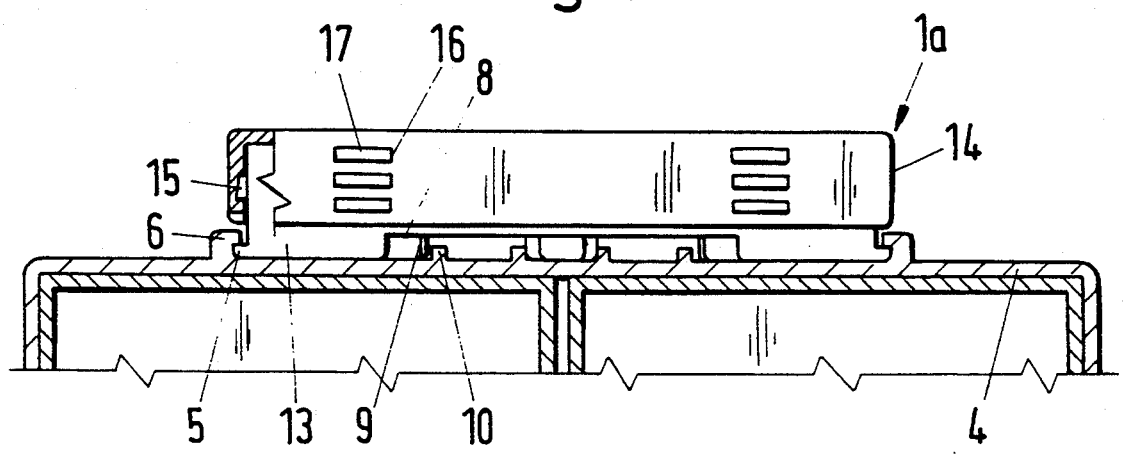
FIG. 4 is a front view of the embodiment shown if FIG. 3.
Figure 5:
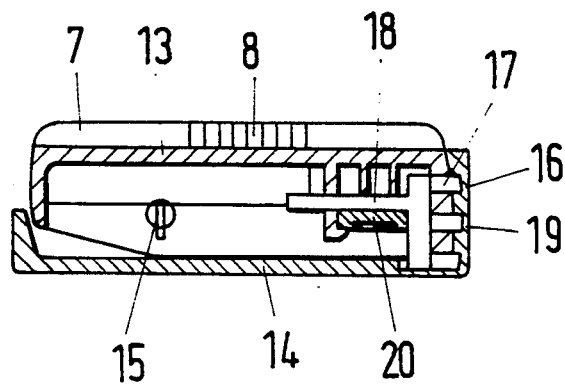
FIG. 5 is a view showing a lateral section taken along the line B—B shown in FIG. 3.
Figure 6:
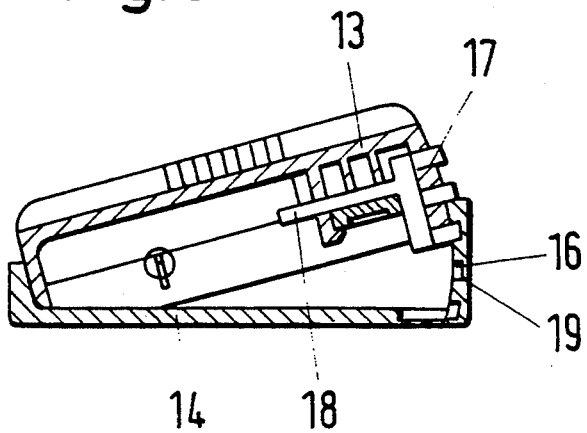
FIG. 6 is a view showing a lateral section of FIG. 5 with an angular position of 15°.

The mounting base 1a can be positioned at an angle of 0° as shown in FIGS. 3-5. It can be locked in the position of 15° as shown in FIG. 6.

It will be understood that each of the elements described above, or two or more together, may also find a useful application in other types of constructions differing from the types described above.

While the invention has been illustrated and described as embodied in a container for sound carriers for mounting in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A container for sound carriers, such as compact cassettes, compact discs, and the like, the container comprising a mounting base mountable in a motor vehicle; a container housing releasibly connected with said mounting base, said mounting base having two side faces provided with retaining rails, said container housing having guides in which said retaining rails of said mounting base engage, said mounting base having further guide surfaces, one of said guide surfaces being formed as a web provided with teeth, said container housing having a rack against which said web resiliently rests; and a metal spring which is attached to said web and supports said web.

2. A container as defined in claim 1, wherein said rack further comprises teeth and said teeth of said web and said rack being rounded.

3. A container as defined in claim 2, wherein said teeth of said web and said rack are provided with inclined tooth profiles.

4. A container as defined in claim 1, wherein said rack further comprises teeth and said teeth of said web and said rack being provided with inclined tooth profiles.

5. A container as defined in claim 1, wherein said container housing has another rack, said racks extending mirror-symmetrically and parallel to one another.

6. A container for sound carriers, such as compact cassettes, compact discs, and the like, the container comprising a mounting base mountable in a motor vehicle; a container housing releasibly connected with said mounting base, said mounting base having two side faces provided with retaining rails, said container housing having guides in which said retaining rails of said mounting base engage, said mounting base having further guide surfaces, one of said guide surfaces being formed as a web provided with teeth, said container housing having a rack against which said web resiliently rests, said mounting base having an upper part connected to said container housing, lower parts mountable in the vehicle and a joint connecting said upper and lower parts with one another, said upper and lower parts further being lockable in various angular positions relative to one another.

7. A container as defined in claim 6, wherein said parts have end faces provided with openings which are arranged one above the other and are aligned with one another; and further comprising slider members guided in said upper part and having end faces provided with projections engaging in said openings in order to lock said parts in angular positions.

8. A container as defined in claim 7; and further comprising a moveable cross-bar connecting said slider members with one another, said cross-bar having obliquely arranged oblong slots, said slider members having pegs engaging in said obliquely arranged oblong slots.

9. A container as defined in claim 8, wherein said container housing has guide bars, said cross-bar having a lock engaging in said guide bars in said container housing and provided with portions of said guide surfaces of said mounting base.

10. A container as defined in claim 6, wherein said rack also has teeth, said teeth of said web and said rack being rounded.

11. A container as defined in claim 6, wherein said rack also has teeth, said teeth of said web and said rack being provided with inclined tooth profiles.

12. A container as defined in claim 10, wherein said teeth of said web and said rack are provided with inclined tooth profiles.

13. A container as defined in claim 6, wherein said container housing has another rack, said racks extending mirror-symmetrically and parallel to one another.

* * * * *